June 4, 1957   E. J. CAVANAUGH   2,794,308
ROTARY REEL MOWER WITH A CASTER WHEEL ASSEMBLY
Filed July 26, 1954   2 Sheets-Sheet 1
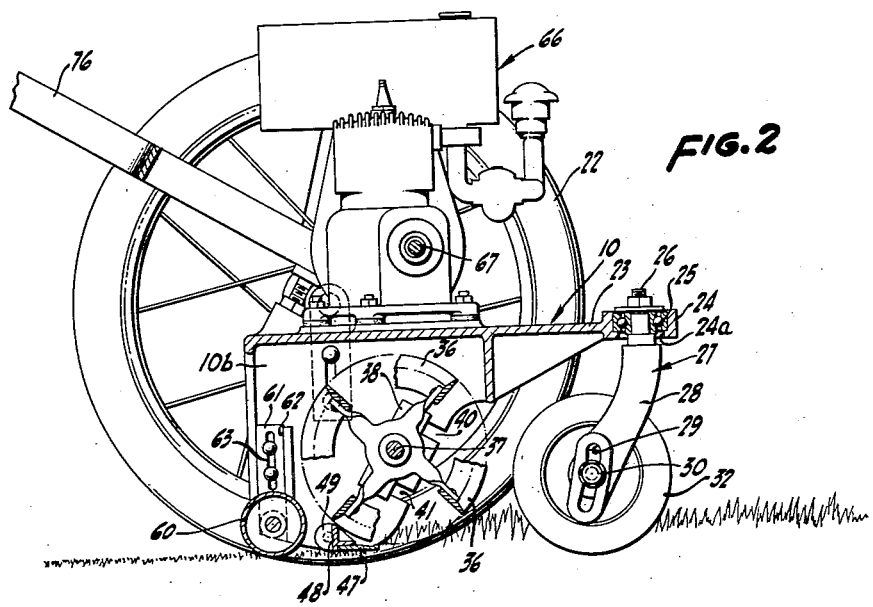
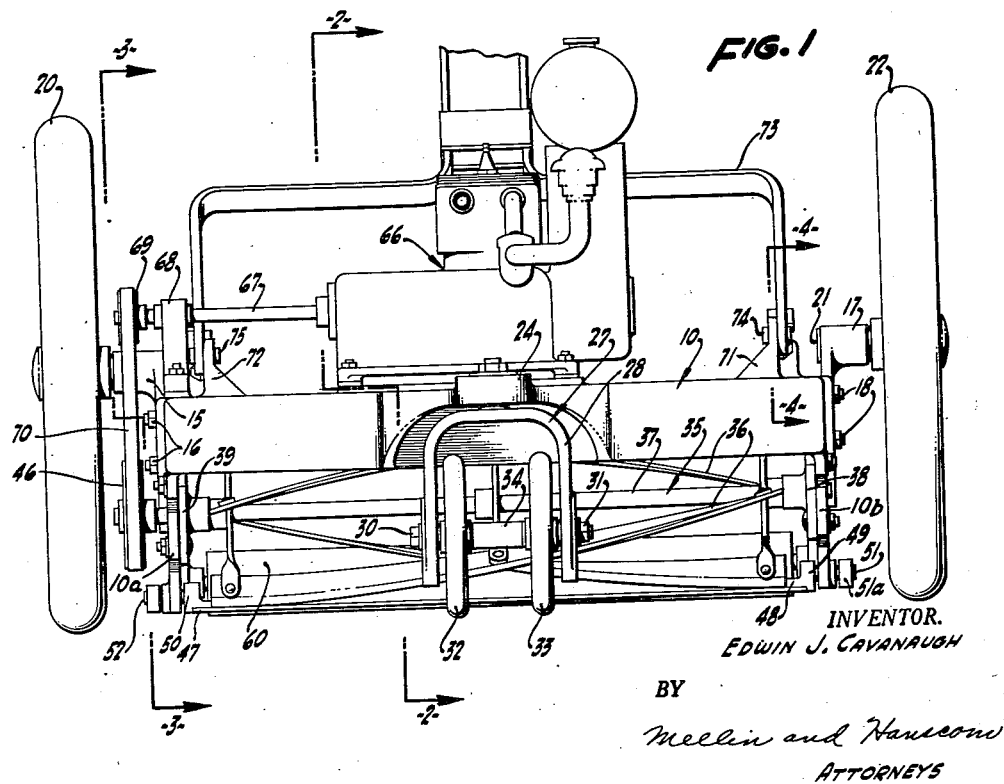
INVENTOR.
EDWIN J. CAVANAUGH
BY
Mellin and Hanscom
ATTORNEYS June 4, 1957  E. J. CAVANAUGH  2,794,308
ROTARY REEL MOWER WITH A CASTER WHEEL ASSEMBLY
Filed July 26, 1954  2 Sheets-Sheet 2
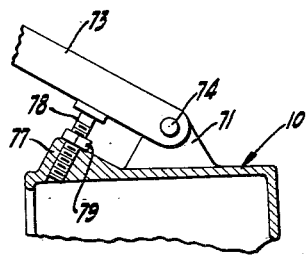
INVENTOR.
EDWIN J. CAVANAUGH
BY
Mellin and Hanscom
ATTORNEYS United States Patent Office 2,794,308
Patented June 4, 1957

2,794,308
ROTARY REEL MOWER WITH A CASTER WHEEL ASSEMBLY

Edwin J. Cavanaugh, Concord, Calif.

Application July 26, 1954, Serial No. 445,853

3 Claims. (Cl. 56—26)

This invention relates to a lawn mower and more particularly to a lawn mower of the type which employs a cutting reel which cooperates with a stationary cutting bar, and wherein the cutting reel is power driven.

A principal object of this invention is to provide a lawn mower structure in which the parts are so arranged that they can be readily adjusted for cutting different heights of grass, the adjustment being such that the cutting bar is maintained in a level position instead of rocking up behind the reel, and thereby efficiently cut the grass whether the mower is adjusted for a low or a high cut.

Another object is to provide a lawn mower such as set forth in the preceding object, wherein the mower assembly is supported mainly by two large wheels mounted one on either side of the mower assembly with their point of contact with the ground located just slightly to the rear of the cutting edge of the cutter bar, and by a caster assembly located centrally of the mower a substantial distance in front of said pair of wheels.

A further object of this invention is to provide a lawn mower such as set forth in the preceding objects wherein the cutting reel is power driven.

Still another object of this invention is to provide a lawn mower such as set forth in the preceding objects wherein the cutting reel assembly may be removed for sharpening or other servicing without disturbing any of the other adjustments of the mower assembly.

A preferred embodiment of the invention is described in the following detailed specification and illustrated by way of example in the accompanying drawings, wherein:

Fig. 1 is a front view of a lawn mower embodying the principles of my invention.

Fig. 2 is a sectional view taken on line 2—2 of Fig. 1.
Fig. 3 is a sectional view taken on line 3—3 of Fig. 1.
Fig. 4 is a sectional view taken on line 4—4 of Fig. 1.

Referring now to the drawings, wherein similar reference numerals are used to denote the same elements throughout the various views shown, 10 generally indicates a one-piece casing or frame. As best seen in Fig. 3, the right side 10a of the casing 10 is provided with two outwardly extending ribs 11 and 12. The surface of the casing 10 between the ribs 11 and 12 and the facing surfaces of the ribs 11 and 12 are machined flat to form a vertical channel 13 on the outside of the casing. A slot 14, extending longitudinally of the channel 13, is cut through the casing 10. A wheel supporting bracket 15 is mounted for vertical slidable movement in the channel 13 and is adapted to be held in adjusted position by a pair of bolts 16 extending through the bracket and the slot 14. As can best be seen in Fig. 1, a similar bracket 17 is adjustably mounted in the same way at the opposite side 10b of the casing 10 and is held in adjusted position by bolts 18. A stub shaft 19 is mounted in the upper end of the bracket 15 and extends outwardly therefrom. A fairly large diameter wheel 20 is rotatably mounted on the stub shaft 19. Similarly, a stub shaft 21 extends outwardly from the upper end of the bracket 17 and a wheel 22 is rotatably mounted thereon in axial alignment with wheel 20.

The casing 10 has a forwardly extending central portion 23 terminating in a horizontal circular boss 24. The boss 24 is recessed as shown at 24a to receive a ball bearing assembly 25 which rotatably supports the vertical post 26 of a caster assembly, generally indicated at 27. The caster assembly 27 comprises an inverted U-shaped bracket 28 which is fastened to the lower end of the vertical post 26. The legs of the U-shaped bracket are bent rearwardly in the manner shown in Figs. 2 and 3. Each of the legs is provided adjacent its lower end with an arcuate slot 29, one of which is shown in Figs. 2 and 3. The arcuate slots 29 are generated about the axis of rotation of a reel hereinafter described. An axle, having a head 30 on one end, extends through the arcuate slots 29 and has a nut 31 screwed onto the opposite end. Two wheels 32 and 33 are independently rotatably mounted on the axle and are separated by a sleeve 34 surrounding the axle between the wheels. The axle and the wheels 32 and 33 mounted thereon may be held in any adjusted position relative to the U-shaped bracket 26 by tightening the nut 31.

A conventional cutter reel assembly, generally indicated at 35 and comprising a plurality of helical blades 36 adapted to rotate about a central axle 37, is mounted for rotation in a pair of rectangular reel supporting side plates 38 and 39. As can best be seen in Fig. 2, the left side 10b of the casing 10 is provided with two slots 40 and 41, which extend upwardly and rearwardly from the front edge thereof. Two bolts (not shown) extend through said slots and are threaded into the reel supporting plate 38. Similarly, the right side 10a of the casing 10 is provided with three slots 42, 43 and 44 which extend upwardly and rearwardly from the front edge thereof. Two bolts 45 extend one through each of slots 42 and 44 and are threaded into the reel supporting plate 39. The axle 37 of the reel extends through the slot 43 and has a drive pulley 46 mounted on its end adjacent the side of the housing 10. From the above description, it can be seen that by loosening the bolts 45, and the bolts threaded into the supporting plate 38, the entire reel assembly can be slipped out of the housing without disturbing any of the other adjustments of the mower. The axis of rotation of wheels 20 and 22 is parallel and to the rear of the axis of rotation of the cutter reel 36, and the caster wheel assembly 27 is mounted on the casing 10 forwardly of the cutter reel 36.

A stationary cutter blade 47 is adapted to cooperate with the helical blades 36 of the reel 35 to provide a shearing action to cut the grass. The blade 47 is mounted horizontally on a transversely extending T-shaped blade supporting member 48 by suitable fastening means (not shown). The blade supporting member 48 has two rearwardly extending lugs 49 and 50 formed integral therewith, one adjacent each end thereof. A stub shaft 51 extends laterally from the lug 49 through the left side 10b of the casing 10 and has an adjusting arm 51a fixed to its outer end. Similarly, a stub shaft 52 fixed to the lug 50 extends laterally through the right side of the casing 10 and has an adjusting arm 53 fixed to its outer end.

Since the adjustment for the blade 48 is the same for both sides, only the right side adjustment will be described. This adjustment is shown in Fig. 3, and comprises an arm 53 fixed to the shaft 52 and extending rearwardly therefrom. A first adjustment screw 54 is threaded through the arm 53 and abuts a stationary abutment 55 formed integral with the casing 10. A lock nut 56 is threaded on the screw 54 and is adapted to abut the arm 53 and jam the adjustment screw 54 in its adjusted position. A second adjustment screw 57 is threaded through a web 58 formed integral with the casing 10 and abuts the upper surface of the arm 53. A lock nut 59 is threaded on the second adjusting screw 57 and is adapted to abut the web 58 to jam the adjusting screw 57 in its adjusted position. It is obvious that by adjusting the screws 54 and 57 and the like screws on the opposite side of the casing 10, the shafts 51 and 52 may be rotated to move the blade 47 toward or away from the reel 35.

As best seen in Fig. 2, a roller 60 extends transversely between the sides 10a and 10b, of the casing 10 rearwardly of the blade 48. The roller 60 is rotatably mounted on two identical roller supporting brackets, one of which is shown at 61. The bracket 61 is slidably mounted in a vertically extending channel-shaped guide 62 on the inside of the casing 10 adjacent the rear edge thereof. A vertical slot 63 is formed in the bracket 61. A pair of bolts 64 extends through the slot 63 and through suitable holes in the casing 10. Each of the bolts 64 is secured by a nut 65 threaded onto its outer end in the manner shown in Fig. 3.

In order to provide a power drive for the reel 35, a combined internal combustion engine and reduction gear unit, generally indicated at 66, is bolted to the upper surface of the casing 10. A drive shaft 67 extends outwardly from the right side of the engine 66 through a suitable supporting pillow block assembly 68 mounted on the casing 10 adjacent the side edge thereof. A drive pulley 69 is mounted on the end of the drive shaft 67, and a drive belt 70 connects the pulley 69 with the pulley 46 previously described.

Two upwardly extending webs 71 and 72 are formed on the upper portion of the casing 10, one adjacent either side thereof. A U-shaped brace 73, having two inwardly extending pins 74 and 75 mounted one adjacent the open end of each arm thereof, is mounted with the pins 74 and 75 extending through suitable apertures in the webs 71 and 72, respectively. A handle 76 is attached to the U-shaped brace 73. A boss 77 is formed on the upper surface of the casing 10 adjacent to and spaced slightly rearwardly of the web 71. An adjustable stop screw 78 is threaded into the boss 77 and is adapted to abut the legs of the brace 73 to prevent the handle 60 from pivoting all the way to the ground. A lock nut 79 maintains the stop screw 78 in its adjusted position.

In the operation of the lawn mower described herein, the mower may be adjusted for the height of the cut by raising or lowering the main supporting wheels 20 and 22 relative to the casing 10 and by raising or lowering the caster wheels 32 and 33 relative to the bracket 26. In this manner, the height of cut is adjusted without disturbing the inclination of the cutting blade 47. The roller 60 is adjustable vertically and is usually adjusted so that the bottom edge thereof is just slightly below the level of the bottom of the blade 47 and above the lower edges of wheels 20 and 22. The roller 60 performs no function when cutting a flat even lawn and could be entirely omitted for such operation. However, the roller 60 performs a very essential function when cutting an uneven lawn or in cutting the edge of a lawn; for example, along a curb line. In the first instance, if one of the main supporting wheels 20 or 22 drops in a depression, the roller 60 will strike the ground and prevent the cutter blade 47 from digging in. In the second instance, the wheel 20 or 22 on the outside may be permitted to overhang the curb and the mower will still be supported by the other wheel 20 or 22, the caster wheels 32 and 33 and the roller 60.

By applying a power drive directly to the reel only, the present construction eliminates the main force required to push a conventional hand mower without sacrificing the inherent maneuverability thereof as is done by conventional power mowers wherein the wheels are driven by the motor and the reel driven by the wheels. The instant construction is very highly maneuverable due to the three-point wheel suspension and particularly due to the double wheel caster assembly.

While I have shown and described the preferred form of my invention, it is obvious that various changes may be made therein by those skilled in the art, without departing from the spirit of the invention as defined in the appended claims.

Having thus described my invention, what I claim and desire to secure by Letters Patent is:

1. A lawn mower comprising a casing, a cutter reel mounted for rotation in said casing, a stationary cutter blade mounted horizontally in said casing in cooperative relationship with said cutter reel, a pair of axially aligned relatively large diameter wheels supported one on either side of said casing for free rotation thereon, the axis of rotation of said wheels being parallel and to the rear of the axis of rotation of said cutter reel, a caster wheel assembly pivotally mounted on said casing centrally thereof and forwardly of said cutter reel, said large diameter wheels and said caster wheel assembly providing a three point support for said casing, and a roller mounted on said casing rearwardly of said cutter reel, said roller having its lowermost portions spaced above the lowermost portions of said large diameter wheels and below said cutter blade.

2. A lawn mower comprising a casing, a cutter reel mounted for rotation in said casing, a stationary cutter blade mounted horizontally in said casing in cooperative relationship with said cutter reel, a pair of axially aligned relatively large diameter wheels supported one on either side of said casing for free rotation thereon, the axis of rotation of said wheels being parallel and to the rear of the axis of rotation of said cutter reel, a caster wheel assembly pivotally mounted on said casing centrally thereof and forwardly of said cutter reel, said large diameter wheels and said caster wheel assembly providing a three point support for said casing, a roller mounted on said casing rearwardly of said cutter reel, said roller having its lowermost portions spaced above the lowermost portions of said large diameter wheels and slightly below said cutter blade, and power drive means mounted on said casing to rotate said cutter reel.

3. A lawn mower comprising a casing, a cutter reel mounted for rotation in said casing, a stationary cutter blade mounted horizontally in said casing in cooperative relationship with said cutter reel, a pair of axially aligned relatively large diameter wheels supported one on either side of said casing for free rotation thereon, the axis of rotation of said wheels being parallel and to the rear of the axis of rotation of said cutter reel, a caster wheel assembly pivotally mounted on said casing centrally thereof and forwardly of said cutter reel, said large diameter wheels and said caster wheel assembly providing a three point support for said casing, means to adjust said large diameter wheels and said caster wheel assembly vertically with respect to said casing whereby the height of cut may be adjusted while maintaining the horizontal position of said cutter blade, a roller mounted on said casing rearwardly of said cutter reel, said roller having its lowermost portions spaced above the lowermost portions of said large diameter wheels and slightly below said cutter blade, and power drive means mounted on said casing to rotate said cutter reel.

References Cited in the file of this patent

UNITED STATES PATENTS

| | | |
|---|---|---|
| 941,127 | Braun | Nov. 23, 1909 |
| 980,817 | Moore | Jan. 3, 1911 |
| 1,197,712 | Dain | Sept. 12, 1916 |
| 1,240,561 | Gore | Sept. 18, 1917 |
| 1,724,409 | Ott | Aug. 13, 1929 |
| 1,891,854 | Wade | Dec. 20, 1932 |
| 2,372,300 | Speiser | Mar. 27, 1945 |
| 2,477,453 | Harley | July 26, 1949 |
| 2,492,521 | Browning | Dec. 27, 1949 |
| 2,555,881 | Grangroth et al. | June 5, 1951 |
| 2,592,963 | Sherrow | Apr. 15, 1952 |
| 2,651,904 | Jatunn | Sept. 15, 1953 |